(12) United States Patent
Ofir

(10) Patent No.: US 10,739,598 B2
(45) Date of Patent: Aug. 11, 2020

(54) HEAD-MOUNTED IMAGING DEVICE

(71) Applicant: LUMUS LTD., Ness Ziona (IL)

(72) Inventor: Yuval Ofir, Kfar HaOranim (IL)

(73) Assignee: LUMUS LTD., Ness Ziona (IL)

( * ) Notice: Subject to any disclaimer, the term of this patent is extended or adjusted under 35 U.S.C. 154(b) by 77 days.

(21) Appl. No.: 16/301,905

(22) PCT Filed: May 18, 2016

(86) PCT No.: PCT/IL2016/050523
§ 371 (c)(1),
(2) Date: Nov. 15, 2018

(87) PCT Pub. No.: WO2017/199232
PCT Pub. Date: Nov. 23, 2017

(65) Prior Publication Data
US 2019/0278086 A1    Sep. 12, 2019

(51) Int. Cl.
*G09G 5/00* (2006.01)
*G02B 27/01* (2006.01)
(Continued)

(52) U.S. Cl.
CPC ......... *G02B 27/0172* (2013.01); *G02B 6/122* (2013.01); *G02B 27/01* (2013.01);
(Continued)

(58) Field of Classification Search
CPC ............... G02B 27/0172; G02B 27/01; G02B 27/0955; G02B 6/122; G02B 2027/015;
(Continued)

(56) References Cited

U.S. PATENT DOCUMENTS 5,712,694 A    1/1998  Taira et al.
8,187,481 B1   5/2012  Hobbs
(Continued)

FOREIGN PATENT DOCUMENTS

IL         232197 A        4/2018
JP     2003337298 A       11/2003
(Continued)

OTHER PUBLICATIONS

S. Chattopadhyay et al: "Anti-reflecting and photonic nanostructures", Materials Science and Engineering: R: Repots, vol. 69, No. 1-3, Jun. 20, 2010, pp. 1-35.
(Continued)

*Primary Examiner* — Adam R. Giesy
(74) *Attorney, Agent, or Firm* — Browdy and Neimark, PLLC

(57) ABSTRACT

An optical system is provided, for use in an electronic device, for example of the kind utilizing a head up display system. The optical system comprising: a light-transmitting waveguide substrate configured for receiving input light indicative of an image being projected, guiding said input light s by total internal reflection, and coupling the light out of the substrate to propagate along an output path in a predetermined direction; at least one transparent optical element accommodated in said output path and interfacing at least a portion of a surface of said waveguide substrate; an interface region between at least a portion of the surface of said waveguide substrate and a surface of the optical element being a patterned interface configured to provide optical coupling between the waveguide substrate and said optical element while maintaining the total internal reflection condition R of light propagation within said light-transmitting waveguide.

20 Claims, 13 Drawing Sheets

(51) Int. Cl.
 *G02B 6/122* (2006.01)
 *G02B 27/09* (2006.01)
(52) U.S. Cl.
 CPC .... *G02B 27/0955* (2013.01); *G02B 2027/015* (2013.01); *G02B 2027/0152* (2013.01); *G02B 2027/0178* (2013.01)
(58) Field of Classification Search
 CPC .... G02B 2027/0178; G02B 2027/0152; G02B 6/24
 See application file for complete search history.

(56) References Cited

U.S. PATENT DOCUMENTS

| 8,873,148 | B1* | 10/2014 | Gupta | G02B 27/01 359/624 |
|---|---|---|---|---|
| 2005/0024849 | A1 | 2/2005 | Parker et al. | |
| 2008/0151375 | A1 | 6/2008 | Lin | |
| 2010/0278480 | A1 | 11/2010 | Vasylyev | |
| 2010/0291489 | A1 | 11/2010 | Moskovits et al. | |
| 2011/0096566 | A1 | 4/2011 | Tsai et al. | |
| 2013/0334504 | A1 | 12/2013 | Thompson et al. | |
| 2015/0182748 | A1 | 7/2015 | Gefen et al. | |
| 2015/0219834 | A1 | 8/2015 | Nichol et al. | |

FOREIGN PATENT DOCUMENTS

| JP | 2007505353 A | 3/2007 |
|---|---|---|
| JP | 2010217906 A | 9/2010 |
| JP | 2012123936 A | 6/2012 |
| JP | 2014506340 A | 3/2014 |
| JP | 2016028275 A | 2/2016 |
| WO | 0195027 A2 | 12/2001 |
| WO | 03081320 A1 | 10/2003 |
| WO | 2005024485 A1 | 3/2005 |
| WO | 2005024491 A1 | 3/2005 |
| WO | 2005024969 A2 | 3/2005 |
| WO | 2005124427 A1 | 12/2005 |
| WO | 2006013565 A1 | 2/2006 |
| WO | 2006085309 A1 | 8/2006 |
| WO | 2006085310 A1 | 8/2006 |
| WO | 2006087709 A1 | 8/2006 |
| WO | 2007054928 A1 | 5/2007 |
| WO | 2007093983 A2 | 8/2007 |
| WO | 2008023367 A1 | 2/2008 |
| WO | 2008129539 A2 | 10/2008 |
| WO | 2008149339 A1 | 12/2008 |
| WO | 12088478 A1 | 6/2012 |
| WO | 2013175465 A1 | 11/2013 |
| WO | 2015081313 A2 | 6/2015 |

OTHER PUBLICATIONS

Petros I Stavroulakis et al: "Suppression of backscattered diffraction from sub-wavelenght "moth-eye" arrays References and Links / Optics Express 1", Endeavour Nanotechnology Zoolog. Sci. Philos. Trans. J. Mod. Opt. Appl. Opt. Opt. Acta (Lond.) Appl. Opt. Appl. Opt. Opt. Lett. Jpn. J. Appl. Pjys. J. Ceram. Soc. Jpn. Opt. Commun. App;. Opt. Opt. Lett. Nanotechno, Jan. 1, 1967, pp. 79-84.

Chin-Hao Chang et al: "Nanostrutured gradient-index antireflection diffractive optics", Optics Letters, vol. 36, No. 12, Jun. 15, 2011, p. 2354.

Qiaoyin Yang et al: "Antireflection effects at nanostructured material interfaces and the suppression of thin-film interference", Nanotechnology, vol. 24, No. 23, May 15, 2013, p. 235202.

Hemant Kumar Raut et al: "Anti-reflective coatings: A critical, in-depth review", Energy & Environmental Science, vol. 4, No. 10, Jan. 1, 2011, p. 3779.

R. J. Weiblen et al: "Optimized moth-eye anti-reflective structures for As_2S_3 chalcogentide optical fibers", Optics Express, vol. 24, No. 10, May 2, 2016 p. 10172.

* cited by examiner (GENERAL ART)

(GENERAL ART)

(GENERAL ART)

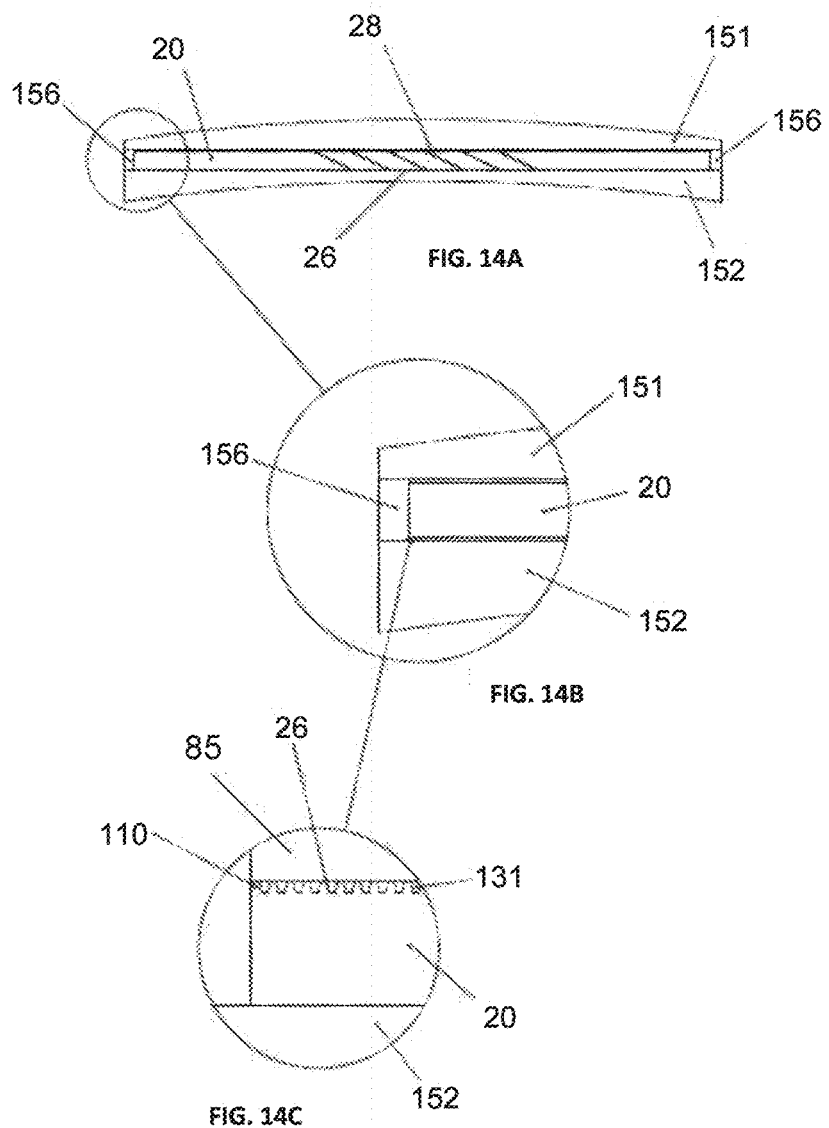

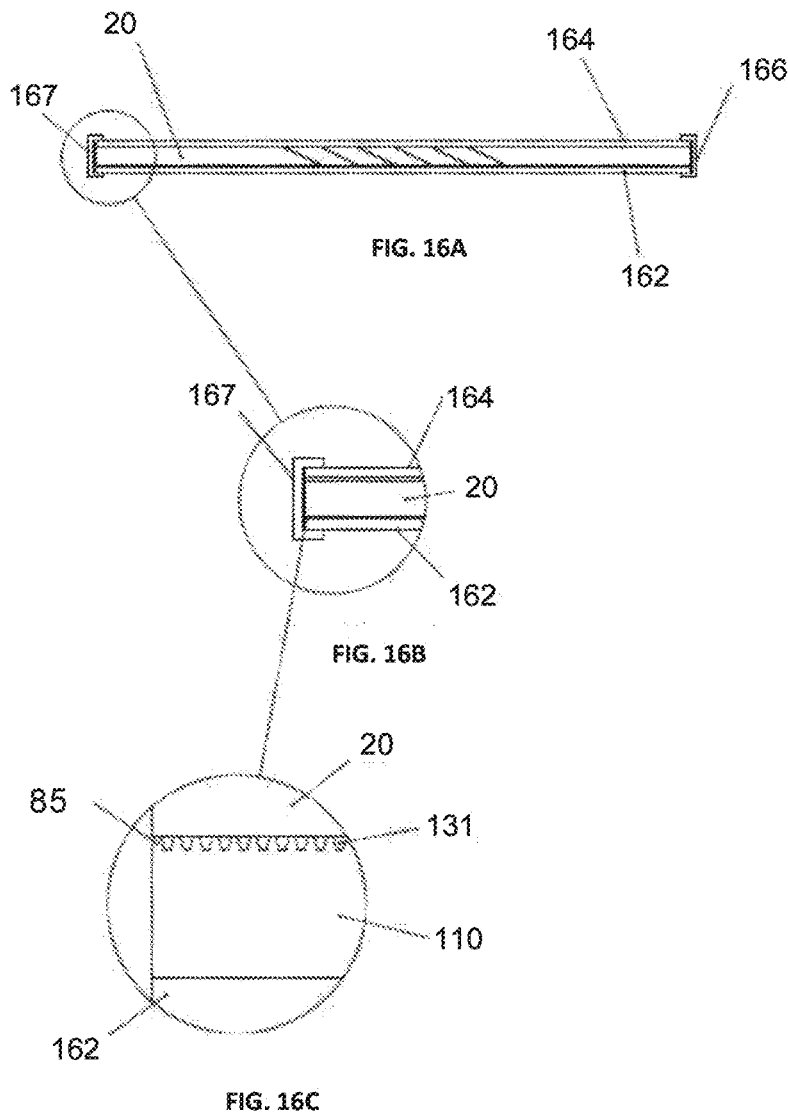

HEAD-MOUNTED IMAGING DEVICE

TECHNOLOGICAL FIELD AND BACKGROUND

The present invention is generally in the field of augmented reality, and relates to an optical device for use in augmented reality system. The invention can be implemented in a large number of imaging applications, such as portable DVDs, cellular phones, mobile TV receivers, video games, portable media players or any other mobile display devices. The invention can be further implemented in any type of a waveguide system that uses a total internal reflection (TIR) principle. In particular, such optical device may be incorporated within a see-through head-mounted display device (e.g. helmet- or eyeglasses-mounted display), which is a wearable display that has the capability of reflecting projected images as well as allowing the user to see through it.

In head-mounted displays (HMDs), an optical module serves both as an imaging lens and a combiner (optical mixer), and a two-dimensional image source is imaged to infinity and reflected into the eye of an observer. Such image source can be obtained either directly from a spatial light modulator (SLM) based on a cathode ray tube (CRT), a liquid crystal display (LCD), an organic light emitting diode array (OLED), a scanning source or similar devices, or indirectly using a relay lens or an optical fiber bundle. The image source typically includes a pixel matrix which is imaged to infinity by a collimating lens and is transmitted into the eye of the viewer by reflecting or partially reflecting surface(s) acting as a combiner for, respectively, non-see-through and see-through applications Various optical devices and systems for augmented reality applications are described in the following patent publications, all assigned to the assignee of the present application and incorporated herein by reference: WO 01/95027, WO 03/081320, WO 2005/024485, WO 2005/024491, WO 2005/024969, WO 2005/124427, WO 2006/013565, WO 2006/085309, WO 2006/085310, WO 2006/087709, WO 2007/054928, WO 2007/093983, WO 2008/023367, WO 2008/129539, WO 2008/149339, WO 2013/175465 and IL 2014/232197.

GENERAL DESCRIPTION

There is a need in the art in a novel optical device for use in augmented reality system, enabling high quality imaging.

As indicated above, conventional augmented reality systems utilize an optical module which serves as an imaging lens and a combiner. Typically, this is a free-space optical module. It is desired to increase a field-of-view (FOV) of the system. However, this results in that the optical module becomes larger, heavier and bulkier. Hence, even for a moderate performance device, such a system is impractical. This is more critical for head-mounted applications, which are to be as light and compact as possible.

It is also desired to reduce the sensitivity of the performance of the optical device to small movements thereof relative to the eye of the viewer, and allow sufficient pupil motion for comfortable reading of text from the displays.

The present invention provides a novel optical device which facilitates the exploitation of a very compact lightguide optical element (LOE) for, amongst other applications, HMDs. The invention allows relatively wide FOVs together with relatively large eye-motion-box (EMB) values/angles. This provides a large, high-quality image, which also accommodates large movements of the eye. The optical system of the present invention is particularly advantageous because it may be more compact than state-of-the-art implementations and yet it can be readily incorporated, even into optical systems having specialized configurations.

The LOE used in the optical device of the invention is a waveguide configured such that light waves are trapped inside the waveguide by total internal reflection. It is often the case that the optical device needs to include one or more additional optical element(s) in a path along which light output from the waveguide propagates to the viewer's eye. Such optical element may or may not have optical power. This may for example be a protective element or an ophthalmic lens, e.g. with optical power prescribed for the specific user.

Thus, proper optical separation is needed between the waveguide (LOE) and such additional optical element(s) at least within an active region defined by light propagation and output of the waveguide namely optical separation enabling to maintain the image quality of the transmitted image. This means that the optical separation between the waveguide and the optical element, on the one hand, allows the reflection of light waves from the external surfaces of the waveguide not to be degraded, and, on the other hand, allows not to disturb the coupling-out and the coupling-in mechanisms of the light waves from and to the LOE, i.e. the total internal reflection effects are maintained at an interface region between the LOE and the optical element.

The present invention solves the above problem by providing the interface region at least within the active region between the waveguide and optical element having a pattern (surface relief) configured to provide an effective pseudo air layer/gap adjacent to (in the vicinity of) the LOE interface effectively maintaining the TIR condition for light interacting with said interface.

The pattern at the interface region actually presents an angular sensitive reflective mechanism such that said interface substantially reflects the entire light waves which are coupled inside the LOE and impinge on the patterned interface at oblique angles, and substantially transmits the light waves which substantially normally (zero angle of incidence) impinge on the interface.

It should be understood that such patterned interface creating effective pseudo air layer/interface may be implemented by one of the following configurations: (i) providing a pattern (surface relief) on at least a portion of the external surface of the waveguide; (ii) providing a pattern on at least a portion of the external surface of the optical element; (iii) using a separate patterned element in between the surfaces of the waveguide and optical element. In the latter case, such separate patterned element may for example be in the form of a film (a so-called "air gap film") associated with either the waveguide's surface or surface of the optical element. Such an air gap film may for example be configured as a moth-eye structure which is configured for the purposes of the invention to provide angular sensitive reflective mechanism.

Thus, generally, the pattern (surface relief) in the interface region is in the form of spaced-apart protrusions. The arrangement of protrusions (i.e. their height and spaces between them) is selected to form a hyperfine structure/subwavelength structure which, for wavelengths of predetermined wavelength range, creates an effective pseudo air layer allowing angular sensitive reflections.

For example, the patterned interface may include a hexagonal pattern of bumps, of about 200 nm height arranged such that their centers are spaced apart about 300 nm. Such bumps are smaller than the wavelength of visible light, and therefore light incident on the interface "sees" the interface as having a continuous refractive index gradient between air (in a contact/interface between the waveguide and optical element area) and the medium of the optical element or waveguide, which maintains the reflection at the LOE lens interface. The same principles can be used for patterns of other shapes and dimensions in order to allow the formation of a pseudo air interface that is relevant in other wavelength ranges (from UV to IR) and wider light incidence angles (0±60 degrees).

Considering the patterned interface created by direct patterning of the surface of the waveguide or the surface of the optical element (e.g. lens), any suitable patterning technique can be used. These include for example, creation of a random texture of antireflective microstructures using a plasma etching process (such technique is known and is described from example in U.S. Pat. No. 8,187,481; or UV imprinting/thermal embossing of a hard coat with a mold having a desired hyperfine-structure; or 2D interference lithography of a hard coat on the surface; or standard high resolution lithography (100 nm or less features).

It should be noted that the waveguide, as well as the optical element (which may or may not have optical power) may be in the form of any suitable transparent structure, e.g. made of glass or plastic, to which the above patterning techniques can be applied. If a plastic structure is used, then thermal embossing of top plastic surface can be used to create a desired pattern. Alternatively, the plastic elements can be produced by a casting or injection molding, where the mold used, already has the negative of the hyperfine structure.

According to the present invention the moth-eye film, or any similar hyperfine structure, is utilized for the creation a pseudo air-layer as well as an anti-reflection interface for normal incident light transmitted through the entire optical element from the surroundings.

When it is required to attach an optical element to the external surface of the LOE, and in case of use of an air gap film having a hyperfine structure the film could be cemented whether to the optical element or to the LOE. Therefore, when the coupled-in light waves inside the LOE impinge on the hyperfine structure at different oblique angles, they "see" only the external part of the periodic structure. Hence, the actual refractive index, which is "seen" by the incoming optical light waves, is close to the refractive index of the air and the total internal reflection mechanism is preserved. On the other hand, the air gap film is substantially transparent to the incoming light waves from the external scene or to the light waves which are coupled out from the LOE.

Thus, according to one broad aspect of the invention, it provides an optical system, comprising: a light-transmitting waveguide substrate configured for receiving input light indicative of an image being projected, guiding said input light by total internal reflection, and coupling the light out of the substrate to propagate along an output path in a predetermined direction; at least one transparent optical element accommodated in said output path and interfacing at least a portion of a surface of said waveguide substrate; an interface region between at least a portion of the surface of said waveguide substrate and a surface of the optical element being a patterned interface configured to provide optical coupling between the waveguide substrate and said optical element while maintaining the total internal reflection condition of light propagation within said light-transmitting waveguide.

The patterned interface is formed by a surface relief on said at least portion of the surface of the waveguide substrate; or by a surface relief on the surface of the optical element; or by an air gap film having a patterned surface and located in between said at least portion of the surface of the waveguide substrate and the optical element. In the latter case, the air gap film is by its substantially unpatterned surface attached to either said at least portion of the waveguide substrate such that said patterned surface faces the optical element, or said surface of the optical element such that said patterned surface faces said at least portion of the waveguide substrate.

The pattern in said patterned interface comprises an array of protrusions forming air pockets between the protrusions and the surface of optical element of the waveguide substrate facing said protrusions. Thus, such patterns forms a pseudo air layer/interface between the waveguide and the optical element. The protrusions typically include dielectric material. Preferably, the protrusions are configured such that a cross section of the protrusion gradually changes from a base portion of the protrusion towards a distal end thereof as a function of a distance from the base portion. With this configuration, the amount of dielectric material of the protrusion at the base portion is preferably maximal, while the amount of the dielectric material of the protrusion at the distal end is minimal. Preferably, a proportional portion of the dielectric material of the protrusion reduces from substantially equal to 1 at the base portion towards substantially equal to 0 at the distal end.

In some embodiments, a length of the protrusion is less than 1 micron.

Preferably, the configuration is such that an effective refractive index at the protrusion distal end is substantially equal to a refractive index of air.

The patterned interface comprises a periodic pattern.

The patterned interface may have a configuration of a moth eye.

The optical element may be a flat transparent substrate. In some embodiments, the optical element is a collimating module. In some embodiments, the optical element is a lens.

In some embodiments, an additional optical element is provided being associated with another portion of a surface of the waveguide substrate via an additional patterned interface. The patterned interfaces may thus be associated with opposite surfaces of the waveguide substrate. The optical elements may be lenses serving for, respectively, imaging the light waves indicative of the (augmented) image being projected onto user's eye and imaging an external scene onto the user's eye.

In some embodiments, the optical element may be composed of at least one lens having a substantially flat surface by which it faces the patterned interface.

In some embodiments, the waveguide substrate and the at least one optical element are assembled inside an eyeglasses frame.

The waveguide substrate and the at least one optical element may be embedded together utilizing a peripheral bonding technique. The waveguide substrate and the optical element may be monolithically embedded together.

The waveguide substrate may comprise at least one partially reflecting surface for coupling the light waves out of the substrate. Such partially reflecting surface is typically inclined with respect to the major surfaces of the waveguide substrate. The partially reflecting surface may be of configured as a diffractive element; as well as may be a substantially flat or curved surface.

The invention, in its another aspect, provides an augmented reality system or a head up display system comprising the above described optical system, and an image generator device for generating light indicative of the image to be projected; and a collimating module for receiving said light and directing the collimated light waves indicative thereof towards the waveguide substrate.

The invention also provides an electronic device comprising the above described optical system. Such electronic device may be a smartphone device, a smartwatch device; the optical element used in such device may be a touch-screen.

The invention also provides an optical module for use in the above described optical system, where the optical module comprise the waveguide structure carrying the at least one patterned interface on the at least portion of the surface of the waveguide.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

Figure 1:
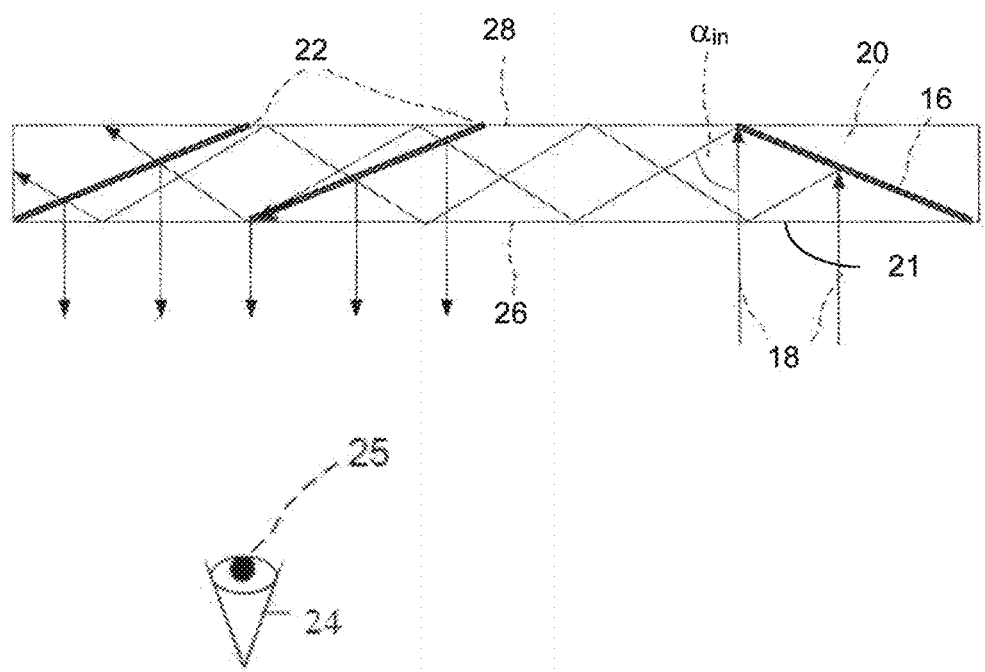
Figure 2:
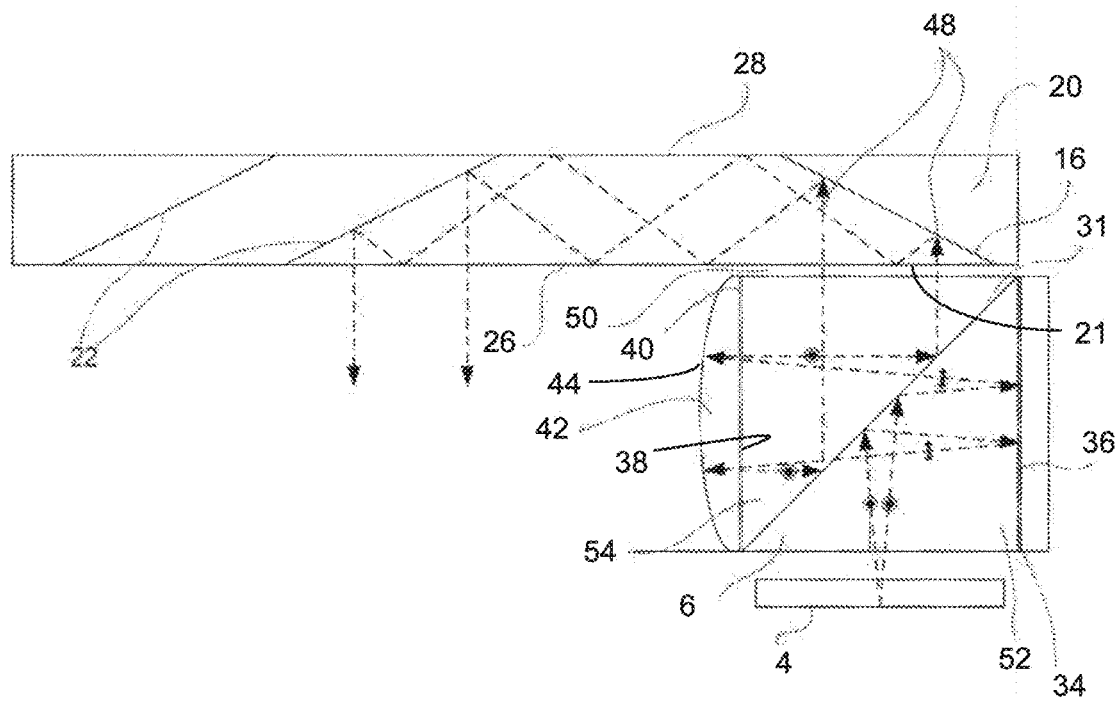
Figure 3:
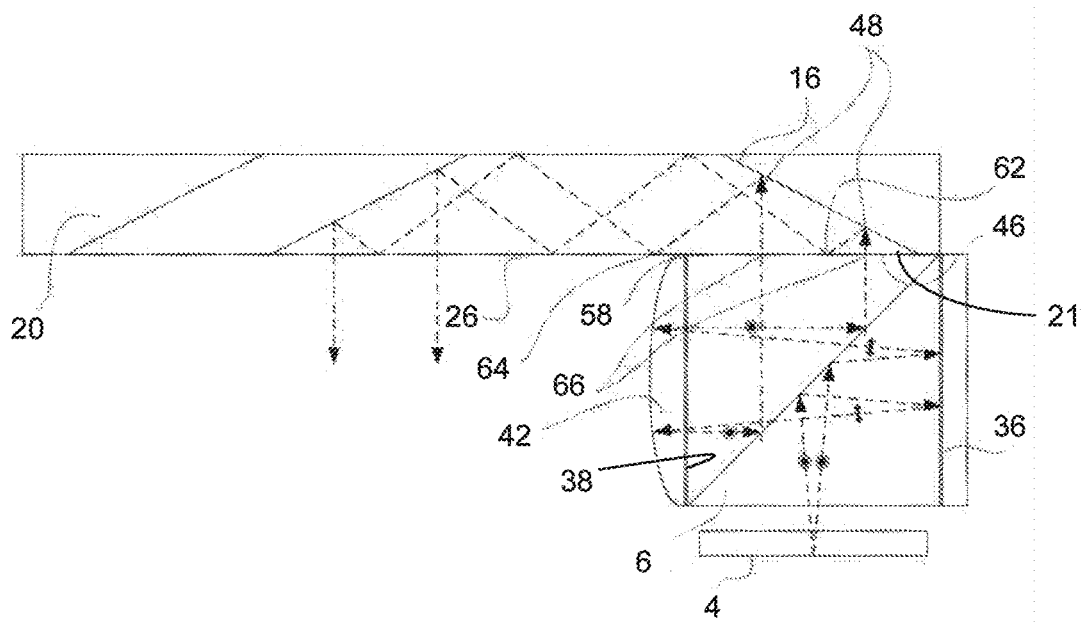

FIGS. 1 to 3 schematically illustrate the general configuration and operational principles of head up display systems, where FIG. 1 is a schematic illustration of a light propagation scheme in a waveguide structure used in an head up display system; and FIGS. 2 and 3 show schematic diagrams illustrating two known configurations, respectively, for collimating and coupling-in input light-waves from a display light source into the waveguide structure.

Figure 4:
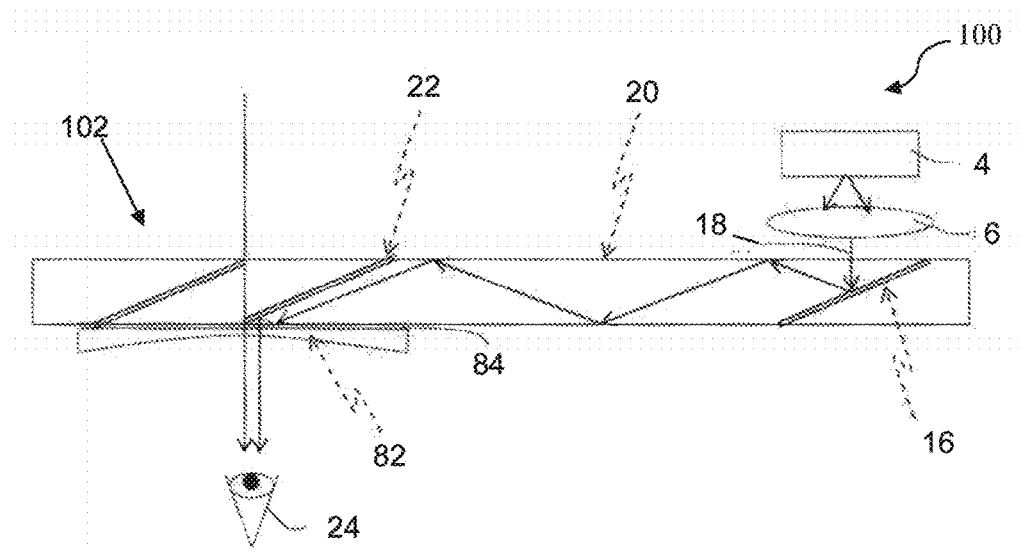
Figure 5:
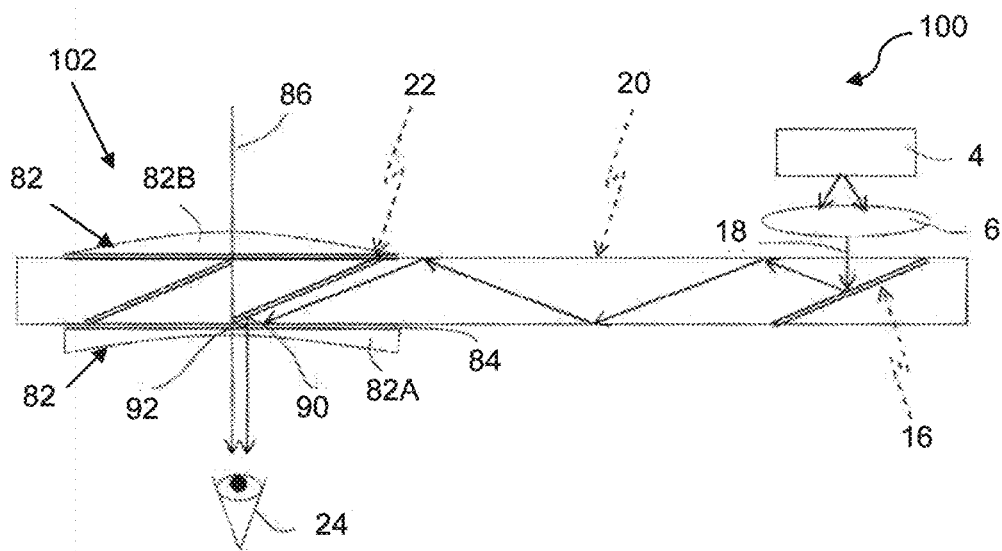
Figure 6A:
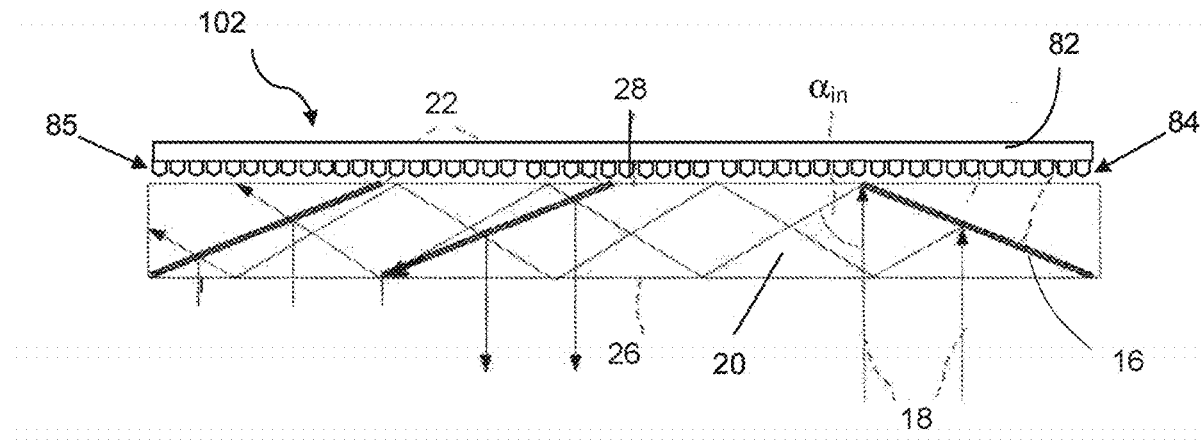
Figure 6B:
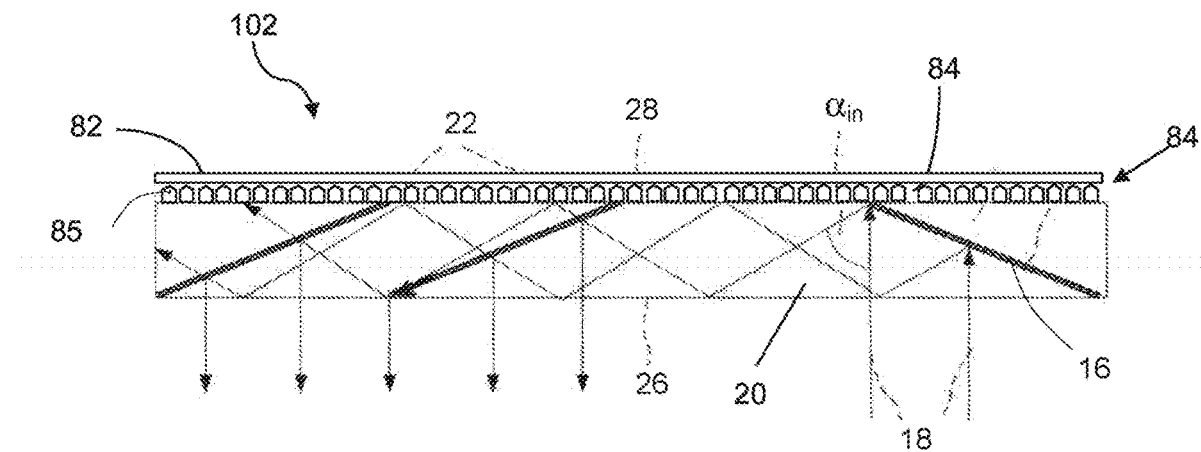
Figure 6C:
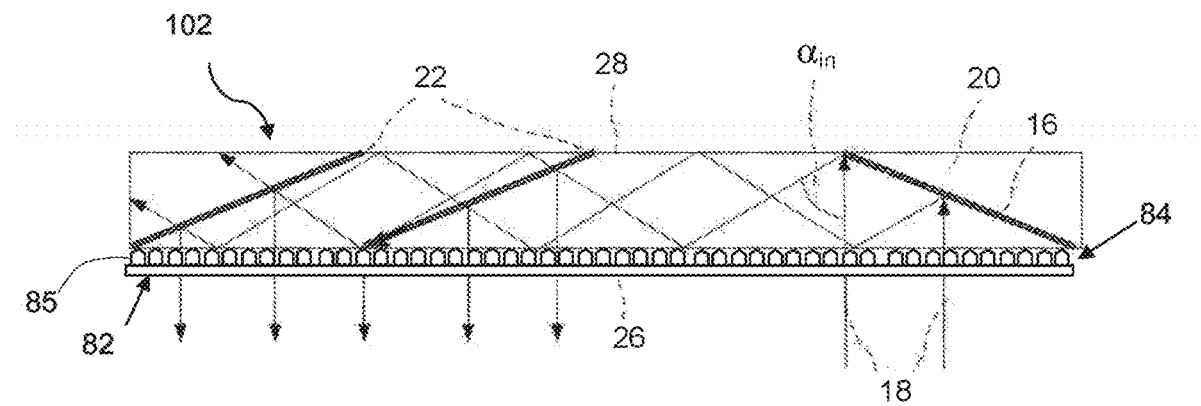
Figure 7A:
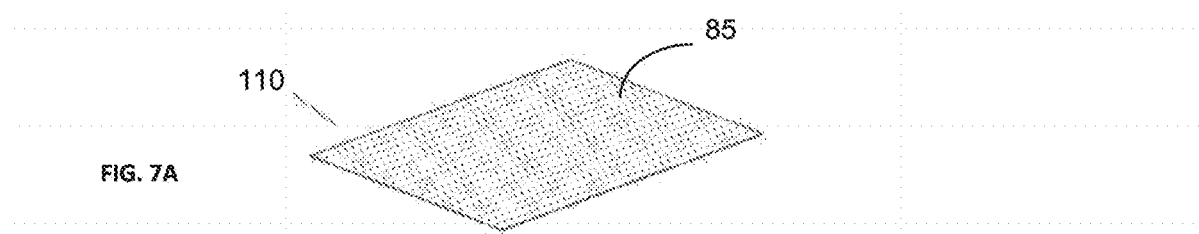
Figure 7B:
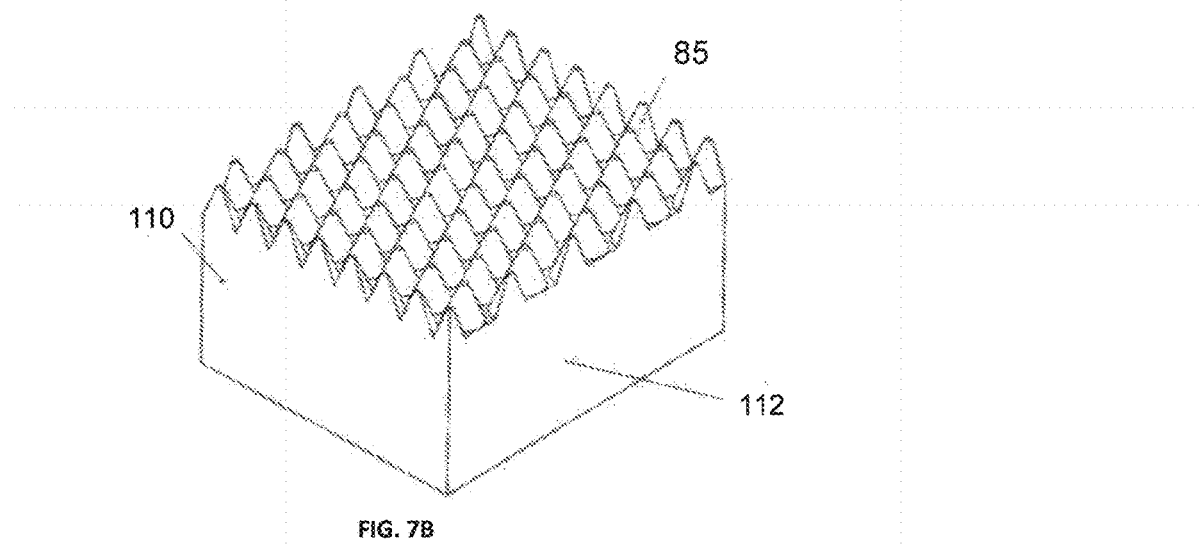
Figure 8A:
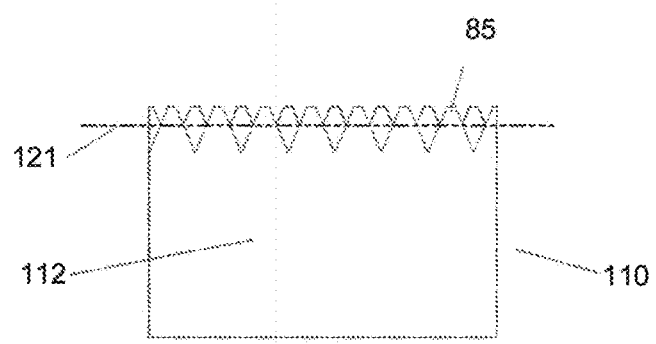
Figure 8B:
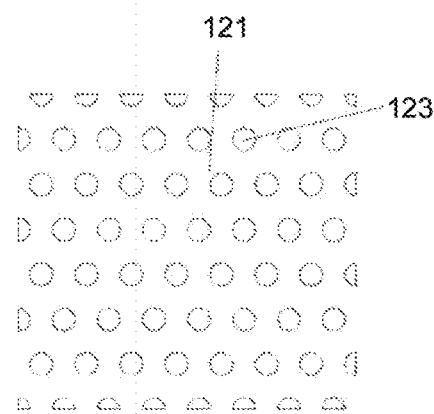
Figure 9A:
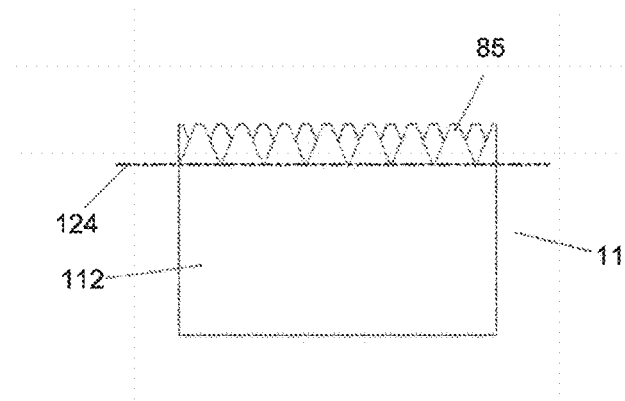
Figure 9B:
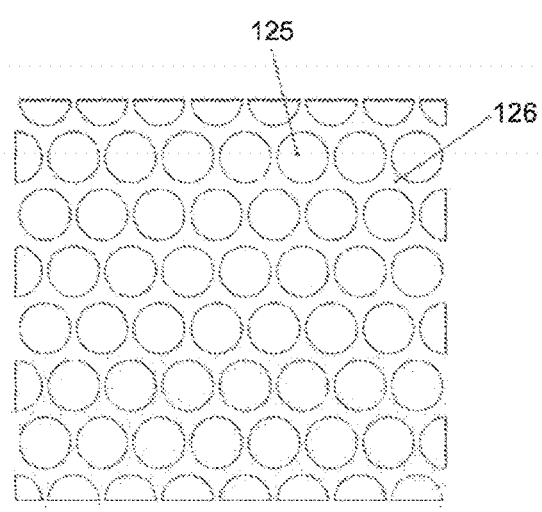
Figure 10A:
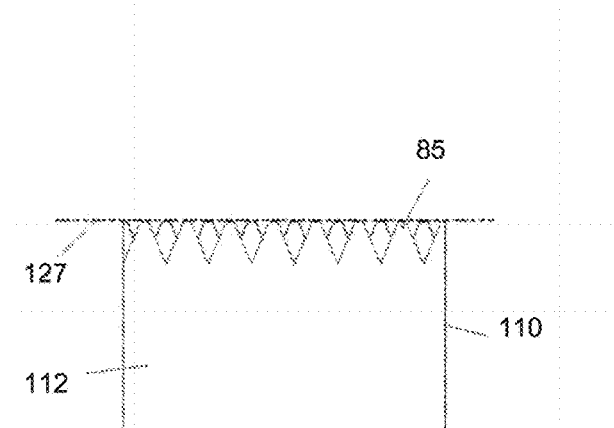
Figure 10B:
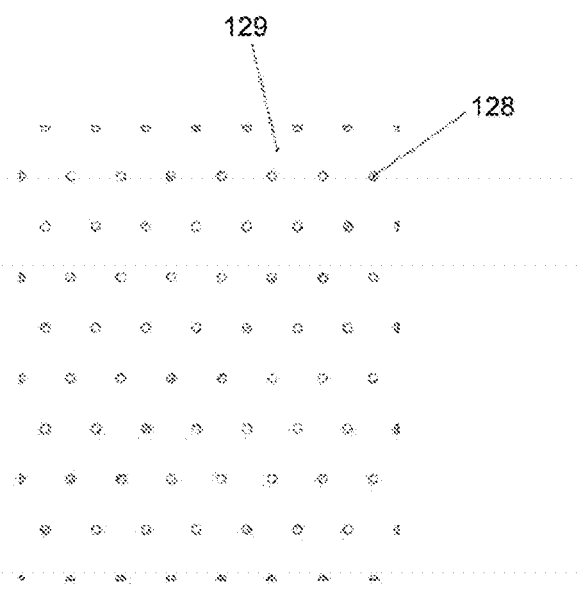
Figure 11:
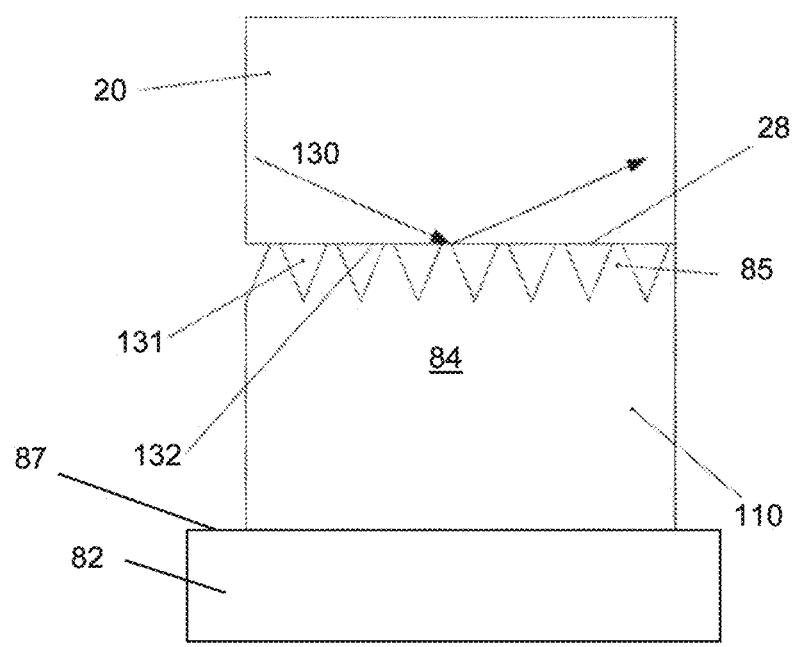
Figure 12A:
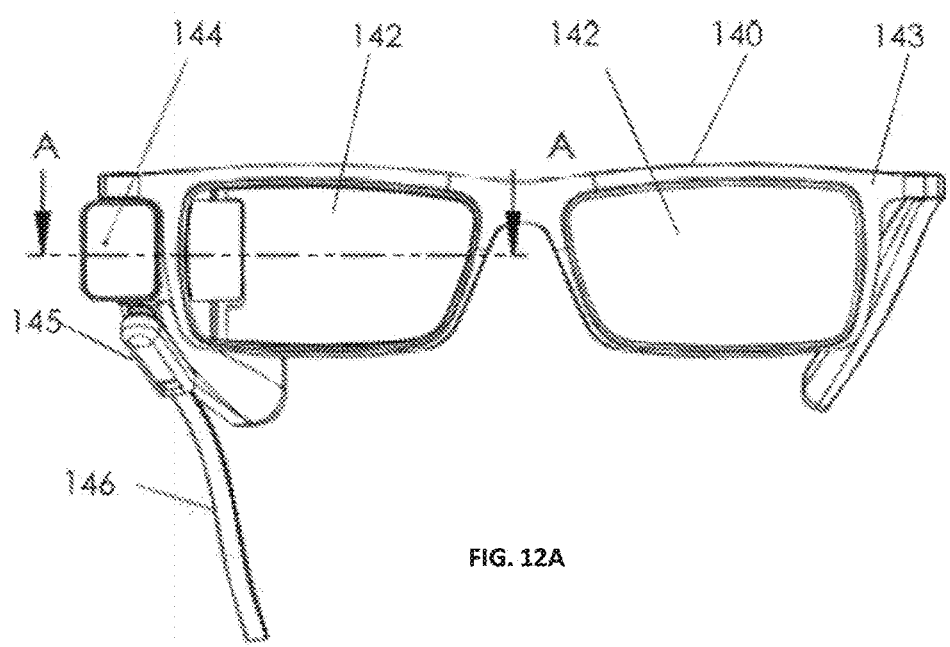
Figure 12B:
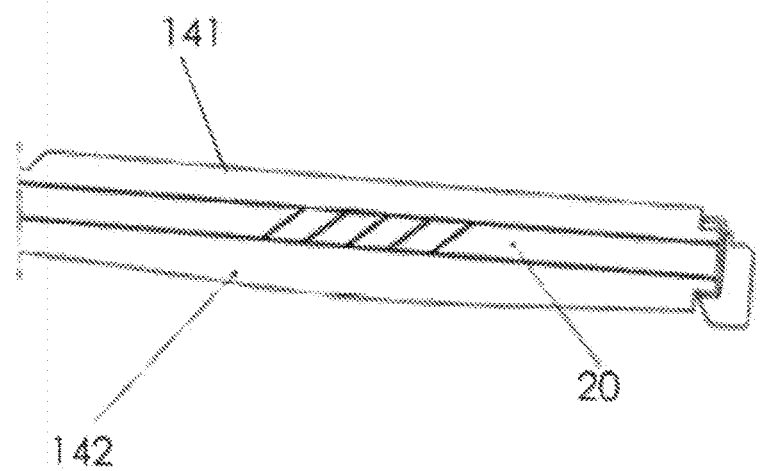
Figure 13A:
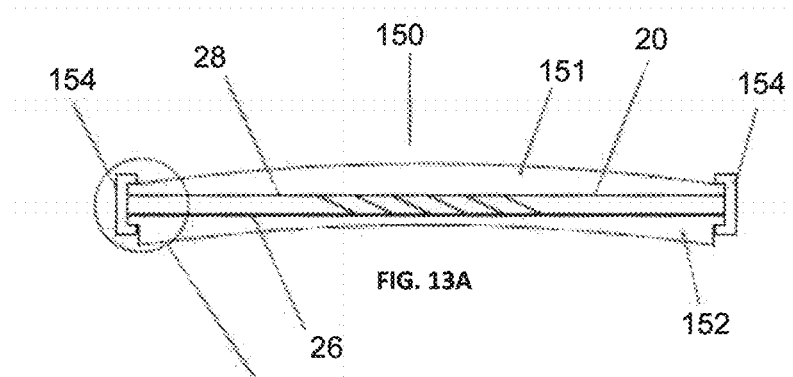
Figure 13B:
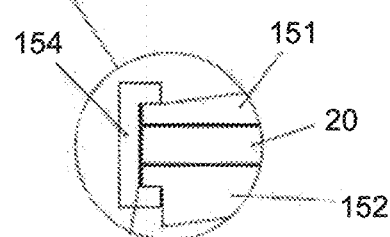
Figure 13C:
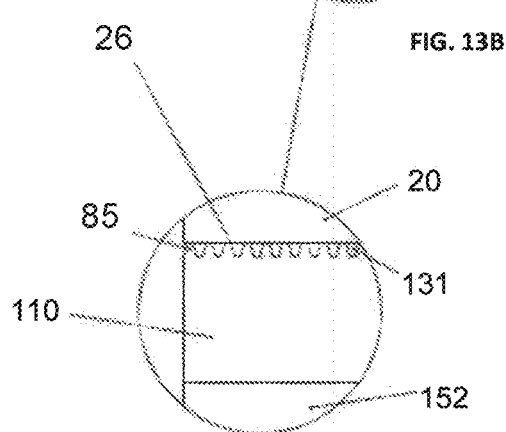
Figure 15A:
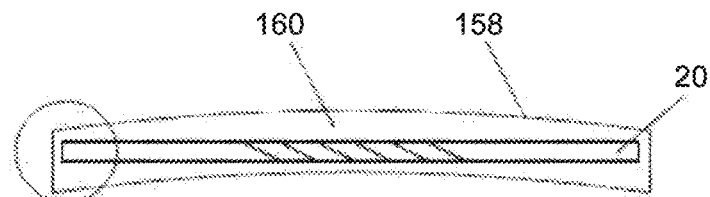
Figure 15B:
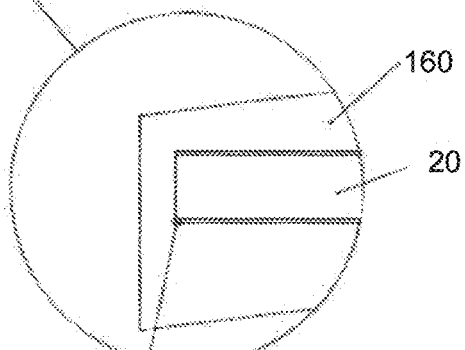
Figure 15C:
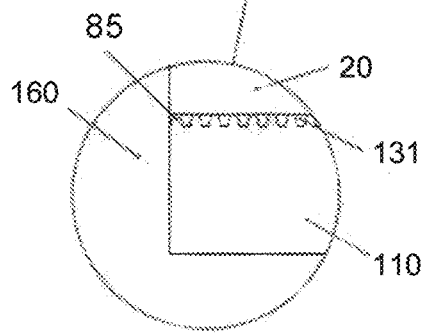
Figure 17:
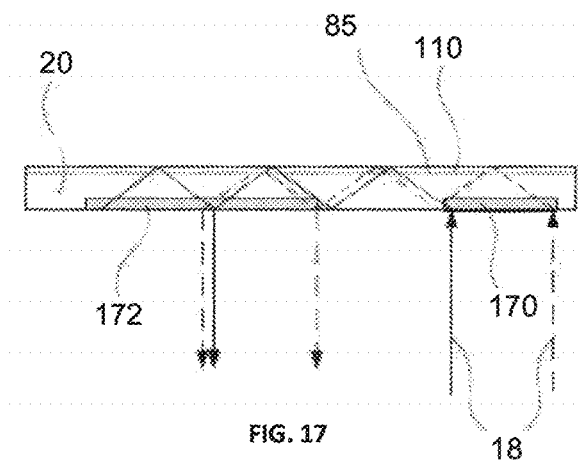
Figure 18:
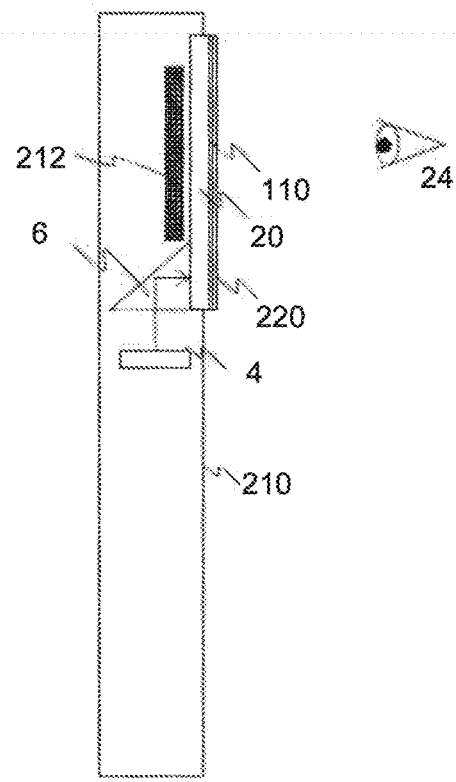

FIG. 4 illustrates an exemplary embodiment of the optical device of the present invention for use in head up display system, wherein the optical element is in the form of a negative lens attached to an external surface of the light-guide optical element;

FIG. 5 illustrates an exemplary embodiment of the optical device of the present invention for use in head up display system, wherein the optical element is in the form of negative and positive lenses attached to the external surfaces of the light-guide optical element;

FIGS. 6A to 6C exemplify three different implementation of a patterned interface in the optical device of the invention obtained by direct patterning of the optical device (FIG. 6A, 6C), direct patterning the surface of the waveguide's surface (FIG. 6B);

FIGS. 7A and 7B are two- and three-dimensional schematic views of an exemplary embodiment of the configuration of the patterned interface being implemented as an air gap film, wherein a hyper-fine periodic structure (pattern) of transparent dielectric material is arranged at a small pitch shorter than the wavelengths of the photonic region, and is constructed on a flat transparent substrate;

FIGS. 8A and 8B respectively illustrate a side view and a top view of an exemplary air gap film;

FIGS. 9A and 9B respectively illustrate a side view and a top view of an exemplary air gap film for an internal cross section which is close to the base;

FIGS. 10A and 10B respectively illustrate a side view and a top view of an exemplary air gap film for an external cross section which is close to the air;

FIG. 11 illustrates an air-gap film which is attached to the external surface of an LOE, wherein a coupled light wave impinges on the interface between the LOE and the film and is totally reflected of the surface;

FIGS. 12A and 12B illustrate how the head up display system utilizing the present invention can be incorporated in the eyeglasses, wherein the LOE is embedded between two optical lenses and assembled inside the eyeglasses frame;

FIGS. 13A, 13B and 13C exemplify how a non-monolithic optical element comprising an LOE can be embedded between a front positive lens and a rear negative lens, mounted together inside a frame without adhesive;

FIGS. 14A, 14B and 14C exemplify another technique for embedding an LOE between two optical lenses, utilizing a peripheral bonding technique;

FIGS. 15A, 15B and 15C exemplify yet another technique for monolithically embedding an LOE between two optical lenses, FIGS. 16A, 16B and 16C exemplify an LOE embedded between two flat substrates and assembled inside a frame;

FIG. 17 exemplifies a waveguide substrate associated with diffractive coupling-in and/or coupling-out optical elements; and FIG. 18 exemplifies the use of the principles of the present invention in a hand-carried display (HHD) configured as a small mobile devices.

DETAILED DESCRIPTION OF THE EMBODIMENTS

Reference is first made to FIGS. 1, 2 and 3 which schematically illustrate the general configuration and operational principles of some head up display systems of the kind to which the present invention relates.

FIG. 1 illustrates a light propagation scheme in a planar waveguide 20, which is time referred to as light-guide optical element (LOE) or substrate suitable to be used in an optical device of the present invention. Generally, the waveguide 20 is configured to provide total internal reflection (TIR) condition for light propagating therein. The waveguide substrate 20 has a light input region 21 (which is aligned with an output of a collimating module, as will be described further below), and light directing interfaces 16 and 22 arranged with proper orientation inside the waveguide.

As shown, input light waves 18 (which are collimated and which are indicative of an image to be presented to a viewer) interact with the reflective interface 16 which reflects these light waves such that they are trapped inside the planar waveguide substrate 20 of the LOE, by total internal reflection. After several reflections from the major lower and upper surfaces 26, 28 of the substrate 20, the trapped light waves reach an array of selective partially reflecting surfaces 22, which couple the light out of the substrate to propagate towards a pupil 25 of viewer's eye 24.

Herein, the light input surface of the LOE will be regarded as the surface through which the input light waves enter the LOE, and the light output surface of the LOE will be regarded as the surface through which the trapped waves exit the LOE. With the LOE configuration illustrated in FIG. 1, both the input and the output surfaces are on the lower surface 26 of the LOE 20. Other configurations, however, are envisioned in which the input and the image waves could be located on opposite sides of the substrate 20, or when the light is coupled into the LOE through a slanted edge of the substrate.

FIGS. 2 and 3 exemplify two examples of the head up display system, in which an optical system includes the above described LOE 20 and a collimating module 6. Light waves 2 which are output of the image creation device 4 (e.g. projector) and which are thus indicative of the image to be displayed, enters the collimating module 6 through its lower surface 30. Typically, these light waves 2 have specific polarization, e.g. s-polarized input light-waves 2. The collimating module 6 is usually made of a light-waves transmitting material, and is associated with a polarizer unit including a polarizing beam splitter 31, polarization rotators (e.g. quarter-wavelength retardation plates) 34 and 40, and reflectors 36 and 44 (e.g. metallic or dielectric coatings). Thus, input polarized light 2 passes through facet 30 of the collimating module 6, and is reflected by the beam splitting surface 31 towards the quarter-wavelength retardation plate 34, and the so-created p-polarized light is reflected by reflector 36 (e.g., a flat mirror) to pass through the retardation plate 34 and then through the polarizing beamsplitting surface 31. These p-polarized light now propagates through facet 38 of the collimating module 6 to pass through the second quarter-wavelength retardation plate 40, and after being collimated by a component 42, e.g., a lens, be reflected by reflector 44 (e.g. reflecting coating on lens's surface), and returned back to pass again through the retardation plate 34. The now s-polarized light-waves are reflected by the polarizing beam-splitting surface 31 and exit the collimating module 6 through its facet 46 by which the module faces the input region 21 of the LOE. The body 6 of the collimating module may be formed by prisms 52 and 54 (e.g. folding prisms).

As shown in the examples of FIGS. 2 and 3, the light output 48 from the collimating module 6 enters the waveguide/substrate 20 through an input region 21 on its lower surface 26. The light waves 48 entering the substrate 20 are reflected from light directing element 16 and trapped in the substrate as described above with reference to FIG. 1. The collimating module 6 formed by the above described elements can easily be integrated into a single mechanical module and assembled independently of the waveguide substrate, without requiring accurate mechanical tolerances. In addition, the retardation plates 34 and 40 could be cemented together with their associated reflecting optical elements 36 and 42, respectively, to form two units.

In the example of FIG. 2, the collimating module 6 is spaced by an air gap from the input region 21 of the waveguide 20. It would be advantageous to attach all the components of the collimating module 6 to the waveguide substrate 20 with appropriate alignment with its input region 21, to form a single compact device of a simplified mechanical construction. This is exemplified in FIG. 3, wherein the upper surface 46 of the collimating module 6 is attached at the interface plane 58, to the lower surface 26 of the substrate 20. However, such configuration utilizing physical attachments between the module 6 and the waveguide 20 has no air gap (50 in FIG. 2) between these structures, while such air gap is essential for trapping the input light waves 48 inside the substrate 20. The trapped light waves 48 should be reflected at points 62 and 64 of the interface plane 58. Therefore, a reflecting mechanism should be applied at this plane, either at the major surface 26 of the substrate 20, or at the upper surface 46 of the collimating module 6. A simple reflecting coating cannot, however, be easily applied, since these surfaces should also be transparent to the light waves that enter and exit the substrate 20 at the exemplary points 66. The light waves incident on surface 48 with small incident angles should pass through this surface, and light waves having higher incident angles should be reflected. Usually, the passing incident angles are between 0° and 15° and the reflecting incident angles are between 40° and 80°.

In the above-described known head up display system, the image which is coupled into the LOE is collimated to infinity. Also, in most head up display applications, it is assumed that the scene is located at the infinity. However, there are applications requiring the transmitted image to be focused to a closer distance, for example, for people who suffer from myopia and cannot properly see images located at long distances. Also, there are professional or medical applications where the external scene is located at closer distances.

Reference is made to FIGS. 4 and 5 exemplifying optical device/systems of the invention which provide for incorporating an additional optical element in the optical module of the head up display system. It should be understood that, although in the description below, such additional optical element is exemplified as a lens (i.e. optical element having optical power), the principles of the invention are not limited to this specific example, and may advantageously be used with any optical element, of any suitable shape, having optical power or not.

To facilitate illustration and understanding, the same reference numbers are used for identifying functionally common components in all the examples.

Thus, FIGS. 4 and 5 illustrate a system 100 including an optical device/module 102 of the invention, which receives from a collimating module 6 (e.g. configured as described above) collimated light indicative of an image created by an image forming device (e.g. projector) 4, and conveys this image to be viewed by user. As schematically shown in the figures, an image 18 from infinity is coupled into a waveguide substrate 20 by a light directing element (reflecting surface) 16, and then further directed (reflected) by an array of partially reflective surfaces 22 into the eye 24 of the viewer. The optical device 102 also includes an optical element, such as a lens 82.

In the example of FIG. 4, this is a plano-concave lens 82 which focuses the image onto a prescribed focal plane and optionally corrects other aberrations of the viewer's eye, e.g. astigmatism. The optical element (lens) 82 is properly optically separated from the waveguide substrate 20 at its flat surface portion 84. An interface region between the waveguide 20 and the optical element 82 providing optical separation between them where waveguide light propagation and light output take place, is at times referred to herein as an active region.

In the example of FIG. 5, the additional optical element 82 has a dual lens configuration, where lenses 82A and 82B are located at opposite sides of the waveguide 20 being aligned with the output region of the waveguide. Image light waves 18 from infinity (obtained by collimation by module 6) are coupled into the waveguide substrate 20 by a reflecting surface 16 and then reflected by an array of partially reflective surfaces 22 and focused by lens 82A into the eye 24 of the viewer. Another image light 86 from a close distance scene is collimated to infinity by lens 82B and then passed through the waveguide substrate 20 into the eye 24 of a viewer. The lens 82A focuses both the projected image 18 and the external scene image 86 onto the focal plane at a convenient distance, usually (but not necessarily always) the original distance of the external scene image, and corrects other aberrations of the viewer's eye, if required.

The lens 82 (FIG. 4) and lenses 82A, 82B (FIG. 5) are simple plano-concave and plano-convex lenses. However, in order to keep the planar shape of the waveguide substrate, it is possible to utilize Fresnel lenses, which can be made of thin molded plastic plates with fine steps. Moreover, an alternative way to implement the lenses, instead of utilizing fixed lenses as described above, is to use electronically controlled dynamic lenses. There are applications where the user will not only be able to see a non-collimated image but also to dynamically control the focus of the image. It has been shown that a high resolution, spatial light modulator (SLM) can be used to form a holographic element. Presently, the most popular sources for that purpose are LCD devices, but other dynamic SLM devices can be used as well. High resolution, dynamic lenses having several hundred features (lines) are known. This kind of electro-optically controlled lenses can be used as the desired dynamic elements in the optical device of the present invention, instead of the fixed lenses described above in conjunction with FIGS. 4 and 5. Therefore, in real time, a user can determine and set the exact focal planes of both the virtual image (augmented image) projected by the waveguide substrate and the real image of the external scene. The lenses 82 (of FIG. 4) and lenses 82A, 82B (of FIG. 5) could be of any desired/required form factor (dimensions), e.g. could correspond to eye-motion-box area for correction lenses, and/or be aligned with the entire waveguide substrate 20 or a desired/required part thereof. For example, if the optical element 82 is a protective element, then it preferably is aligned with the entire waveguide's surface (i.e. the interaction region extends along the entire waveguide substrate). This depends on the type of the additional optical element(s), as well as the manufacturing technology of the waveguide and optical element(s).

As explained above with regard to FIG. 3, a thin air gap is to be maintained between the lens and the waveguide substrate, to ensure the trapping of the image light waves (light waves 18 of projected image) inside the waveguide substrate by total internal reflection.

As illustrated in FIGS. 4 and 5, it would be advantageous to attach the optical element 82 (single-lens or dual lens 82A-82B) to the waveguide substrate 20, to form a single (integral), compact simplified mechanical module. Clearly, the main problem as hereinbefore described, is that the attaching procedure cancels the previously existing air gap between the substrate 20 and the optical element 82, which gaps are essential for trapping image light waves inside the waveguide substrate 20. As shown in FIG. 5 (being also true for FIG. 4), the trapped image light waves are to be reflected at point/location 90 of the interface region 84 and transmitted through the same interface at point/location 92. Therefore, a similar reflecting mechanism as described above in relation to FIG. 3 should be applied at this region.

To achieve the required totally reflecting mechanism, the interface region 84 should be properly configured with a pattern 85 having subwavelength features, e.g. a surface relief in the form of an arrangement of spaced-apart protrusions having height and spaces between them selected to form a hyperfine structure/subwavelength structure which, for wavelengths of predetermined wavelength range, creates a refractive index profile causing angular sensitive reflections.

The patterned interface 84 may be implemented providing a pattern (surface relief) on at least a portion of the external surface of the waveguide or on at least a portion of the external surface of the optical element. This is exemplified in FIGS. 6A to 6C. It should be understood that the pattern in the figure is not to scale, just in order to facilitate understanding. In the example of FIGS. 6A and 6C, the patterned interface 84 is formed by direct patterning (creation of a surface relief) of at least a portion of the surface of optical element 82. In the example of FIG. 6B, the patterned interface 84 is formed by direct patterning (creation of a surface relief) of at least a portion of the surface 28 of the waveguide substrate 20.

As described above, such patterned interface created by at least partial direct patterning of the surface of the waveguide and/or the surface of the optical element may be obtained using any known suitable patterning technique. Some specific, but not limiting example of such technique include creation of a random texture of microstructures using a plasma etching process; UV imprinting/thermal embossing of a hard coat with a mold having a desired hyperfine-structure; 2D interference lithography of a hard coat on the surface; standard high resolution lithography.

Alternatively (or additionally), the patterned interface may utilize a separate patterned element in between the surfaces of the waveguide and optical element. Such separate patterned element may be in the form of a film (a so-called "air gap film"), e.g. configured utilizing the principles of a moth-eye structure which, according to the invention, is configured to provide angular sensitive reflective mechanism effectively creating a pseudo air gap. Such transparent air gap film may be attached to the major surface of the waveguide substrate, or the surface of the optical element. Such air gap film is schematically exemplified in FIGS. 7A and 7B. The air gap film is an optical device 110 having a flat transparent (dielectric) substrate/base 112 which has on its surface a hyper-fine periodic pattern 85 (surface relief) of features arranged at a small pitch shorter than the wavelengths of the photopic region, e.g., moth-eye film having a dense (uneven) hyperfine periodic structure. The height of the surface relief is preferably (but not necessarily) less than 1 micron. This film 110, when located between the surfaces of the waveguide 20 and the optical element 82 (while being attached to one of them) presents the patterned interface region 84.

In any one of the examples of FIGS. 6A-6C and 7A-76B, the protrusions/features of the pattern preferably have varying cross section, such that the cross sectional dimension of the protrusion is gradually reduced in a direction from the base towards the distal end of the protrusion. The pattern 85 is such that the distal end of the features faces either the optical element or the waveguide.

As illustrated more specifically in FIGS. 8A and 8B, any cross section 121 parallel to the surface of the air gap film 110 has a periodic formation/protrusion, wherein the proportional portion of the dielectric material 123 in the relief formation is changed gradually as a function of distance from the film itself.

As further seen in FIGS. 9A-9B and 10A-10B, in the internal cross section 124, which is close the film's base 112, i.e., the lower (proximal) portion of the hyperfine structure 85, the proportional portion of the dielectric material 125 in the relief formation 126 is maximal and substantially close to 1, while in the external cross section 127, i.e., close to the upper portion (distal end) of the hyperfine structure 85, the proportional portion of the dielectric material 128 in the relief formation 129 is minimal, namely, significantly lower than in material 125, and substantially equal to zero.

Typically, when light waves pass through an optical device having a periodically patterned structure, diffraction of light occurs and the brightness of the zero order of the diffracted light, namely, the light which is transmitted through the device without any diffraction, is considerably reduced. When the pitch of the hyper-fine periodic structure is, however, considerably shorter than the wavelength of the incoming light waves, no diffraction occurs. Instead, since the optical waves interacts with a medium having an effective refractive index which is the average of the materials contained in this medium, effective anti-reflection properties can be obtained.

On the other hand, when light waves impinge on the periodic hyperfine structure 85 at the upper side (distal end) of the structure at oblique angles, they "see" (are affected by) only the external part of the periodic structure, wherein the proportional part of the transparent material is very low. Therefore, the actual/effective refractive index, which is "seen" by the incoming optical waves (i.e. which affects the light wave propagation), is close to the refractive index of the air.

As illustrated in FIG. 11, when such a patterned structure (e.g. an air-gap film) is provided between the external surface 28 of the waveguide substrate 20 and the external surface 87 of the optical element 82 (e.g. film attached to the surface of the optical element as shown in this specific not limiting example), the patterned structure faces the waveguide and forms the patterned interface region 84. The coupled light waves 130 impinge on an interface 132 between the waveguide substrate 20 and the distal end of the pattern/film at angles higher than the critical angle, the air 131 confined between the film 110 and the waveguide substrate 20 provides an optical isolation due to the air-like refractive index in the boundary surface. Therefore, the condition of total internal reflection of the coupled-in light waves from the external surface is preserved and the light waves are contained inside the waveguide substrate. It should be understood that the same effect will take place while attaching such air film to the external surface 28 of the waveguide substrate 20 (or direct patterning of the waveguide substrate) with the patterned structure facing the optical element 82. The geometrical characteristic of the hyperfine structure, such as the height, peak-to-peak and width thereof, can be between 10 to 800 nanometers. It should be understood that the shape of the hyperfine structure needs not be that of the moth eye. Any other nanostructure shape, such as pyramids, prisms, cones and others, can be utilized. Moreover, the hyperfine structure needs not be specifically periodic, although a periodic structure is usually easier to fabricate. The hyperfine structure suitable to be used in the invention is, on one hand, solid enough not to collapse during the attaching process, and, on the other hand, the proportional portion of the dielectric material in the external cross-section of the structure is substantially equal to zero, to maintain the total internal reflection condition inside the waveguide substrate. In addition, the size of the basic elements of the hyperfine structure is not be too large, in order to avoid diffraction effects. However, reducing the thickness of the hyperfine structure to below 100 nm might undesirably allow the penetration of the trapped waves through the air gap film and the deterioration of the total internal reflection phenomena. Hence, the hyperfine structure thickness is preferably between 200 and 300 nm.

Reference is made to FIGS. 12A and 12B, where FIG. 12A schematically illustrates an eyeglasses system 140 and FIG. 12B shows the waveguide substrate 20 which is embedded between lenses 141, 142 of the dual-lens optical element (corresponding to duel lens configuration 82A-82B as described above) and assembled inside the eyeglasses frame 143. As seen, in addition to the optical elements, the frame can contain other accessories including a camera 144, a microphone 145, earphones 146, USB connectors, memory cards, an inertial measurement unit (IMU), and the like.

FIGS. 13A, 13B and 13C illustrate a non-monolithic optical device 150 comprising a waveguide substrate 20 embedded between front positive lens 151 and rear negative lens 152 (constituting a dual-lens or two-part optical element), mounted together inside a frame 154 without adhesive. In this specific example, the patterned interface(s) 84 between the waveguide 20 and the optical element(s) is constituted by, is an air gap film, but it should be understood, and described above, that the invention is not limited to this specific example. The air gap films 110 (FIG. 13C) could be placed or bonded between the waveguide substrate 20 and the lenses 151, 152, wherein the hyperfine structure(s) 85 respectively facing the external surfaces 26 and 28 of the waveguide substrate 20. The air gap films 110 (FIG. 13C) could also be placed or bonded between the waveguide substrate 20 and the lenses 151, 152, with the hyperfine structures 85 respectively facing the external surfaces 26 and 28 of the waveguide substrate 20. The air gap films 110 can be directly cemented on the planar surfaces of the optical lenses 151 and 152 using pressure-sensitive adhesive (PSA), a thermally curable or UV-curable adhesive or can be fabricated directly as an integral part of the lenses utilizing embossing, injection molding, casting, machining, soft lithography or any other relevant fabrication method. The embedded optical element 150 can be assembled inside the frame 154 utilizing pressure or cementing techniques. The interface could be also created by at least partial (within the active area) direct patterning of the surface of the waveguide or the surface of the optical element obtained using any known suitable patterning technique.

An alternative technique for monolithically embedding the waveguide substrate 20 between the two optical lenses is exemplified in FIGS. 14A, 14B and 14C. The waveguide substrate 20 is embedded between the optical lenses utilizing a peripheral bonding technique. The front lens 151 and rear lens 152 are cemented to the peripheral edges of the waveguide substrate 20 using optical or non-optical adhesive or any other high-viscosity adhesive 156 that mount all components together. The viscosity of the adhesive is selected to be high enough in order to prevent leakage of the adhesive into protrusions in the optically active are or air pockets 131 which are confined between the film 110 and the waveguide substrate 20. Such a leakage can eliminate the air gap which is required to preserve the total internal reflection of the light waves from the external surfaces of the waveguide substrate. The required adhesive 156 can, for example, be OP-67-LS or any room temperature vulcanization (RTV) silicone. The interface could be also created by at least partial (active area) direct patterning of the surface of the waveguide or the surface of the optical element obtained using any known suitable patterning technique.

Yet another alternative technique for monolithically embedding the waveguide substrate 20 between the two optical lenses is exemplified in FIGS. 15A, 15B and 15C. The production procedure of the embedded element may be as follows: placing the air gap film 110, with the hyperfine structures 85 facing the external surfaces 26 and 28 of the waveguide substrate 20; utilizing attaching techniques such as static electricity; preparing a mold 160 having the required external shape of the element; inserting the waveguide substrate 20 into the mold; casting or injecting the liquid resin polymer into the mold, curing the polymer by UV or by changing the polymer temperature, and finally, ejecting the embedded element from the mold. As explained above in relation to FIGS. 14A to 14C, the hyperfine regions are isolated from the injected material during the injection molding process, in order to prevent a leakage of the material into the air pockets 131 between the waveguide substrate 20 and the air gap film 110.

The above described FIGS. 12A to 15C illustrate different techniques for forming an optical device comprising a waveguide substrate embedded between two optical elements (lenses). However, there are some applications requiring attachment of planar elements to the external surfaces of the waveguide substrate. An example for such an embodiment is illustrated in the above-described FIG. 4 wherein the collimating element/module 6 is attached to the waveguide substrate 20. Some other reasons for attaching a flat optical element to a waveguide substrate can be for mechanically protecting the waveguide substrate to enhance the user's eye-safety, or applying a coating on the external surface of the flat element to achieve various characteristics such as, photochromic response, scratch resistance, super-hydrophobicity, tinted (colored) view, polarization, anti-finger print and the like.

A waveguide substrate 20 embedded between two flat optical elements (substrates) 162 and 164 and assembled inside frames 166, 167 is exemplified in FIGS. 16A, 16B and 16C. The embedding process of the waveguide substrate and flat elements can be implemented utilizing mechanical attachment, peripheral cementing or monolithic fabrication. Embedding processes can include attaching only a single element to one of the external surfaces of the waveguide substrate or combining different elements, such as flat substrates as well as curved lenses.

In all the embodiments illustrated so far the element for coupling light waves out of the waveguide substrate is at least one flat partially reflecting surface 22 located inside the waveguide substrate 20, which is usually obtained using a partially reflecting dielectric coating, and is non-parallel to the major surfaces of the waveguide substrate. However, the special reflective mechanism provided according to the present invention in the form of a patterned interface can be exploited also for other coupling-out technologies. FIG. 17 illustrates a waveguide substrate 20 wherein a coupling-in element 170 and/or a coupling-out element 172 are provided which are diffractive elements. In addition, other coupling-out elements like a curved partially reflecting surface and other means can be used.

The embodiments of the above-described FIGS. 12-16 are just examples illustrating the simple implementation of the present invention. Since the substrate-guided optical element, constituting the core of the system, is very compact and lightweight, it could be installed in a vast variety of arrangements. Hence, many other embodiments are also possible, including a visor, a folding display, a monocle, and many more. This embodiment is designated for applications where the display is to be near-to-eye; head-mounted, head-worn or head-carried. There are, however, applications where the display is located differently. An example of such an application is a hand-carried device for mobile applications, such as for example a smartphone or smartwatch. The main problem of these smart deices is the contradiction between the required small size and volume and the desired high quality image.

FIG. 18 illustrates an alternative technique, based on the principles of the present invention, which eliminates the current necessary compromise between the small size of mobile devices and the desire to view digital content on a full format display. This application is a hand-carried display (HHD) which resolves the previously opposing requirements, of achieving small mobile devices, and the desire to view digital content on a full format display, by projecting high quality images directly into the eye of the user. An optical module/device includes a display source 4 (image generator), the folding and collimating optics 6 and the waveguide substrate 20 which are all integrated into the body of a smart device 210, where the waveguide substrate 20 replaces the existing protective cover-window of the phone. Specifically, the volume of the support components, including source 4 and optics 6, is sufficiently small to fit inside the acceptable volume for modern smart device. In order to view the full screen, transmitted by the device, the window of the device is positioned in front of the user's eye 24, observing the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely there is an option to maintain the conventional display 212 intact. In this manner, the standard display can be viewed through the waveguide substrate 20 when the display source 4 is shut-off. In a second, virtual-mode, designated for a massive internet surfing, or high quality video operations, the conventional display 212 is shut-off, while the display source 4 projects the required wide FOV image into the eye of the viewer through the waveguide substrate 20. Usually, in most of the hand-carried smart devices, the user can operate the smart device by using a touch screen which is embedded on the front window of the device. As illustrated in FIG. 18, the touch screen 220 can be attached to a smart device by directly cementing it on the external surface of the air gap film 110 which is located on the waveguide substrate 20.

What is claimed is:

1. An optical system, comprising:
   a light-transmitting waveguide substrate configured for receiving input light indicative of an image being projected, guiding said input light by total internal reflection, and coupling the light out of the substrate to propagate along an output path in a predetermined direction;
   at least one transparent optical element accommodated in said output path and interfacing at least a portion of a surface of said light-transmitting waveguide substrate,
   an interface region between at least a portion of the surface of said light-transmitting waveguide substrate and a surface of the optical element being a patterned interface configured to provide optical coupling between the light-transmitting waveguide substrate and said optical element while maintaining the total internal reflection condition of light propagation within said light-transmitting waveguide substrate,
   wherein a pattern in said patterned interface comprises an array of protrusions forming air pockets between the protrusions and the surface of optical element of the waveguide substrate facing said protrusions, and
   each of the protrusions is configured such that a cross section of the protrusion gradually changes from a base portion of the protrusion towards a distal end thereof as a function of a distance from the base portion.

2. The optical system according to claim 1, wherein said patterned interface is formed by a surface relief on either said at least portion of the surface of the waveguide substrate, or the surface of the optical element.

3. The optical system according to claim 1, wherein said patterned interface is formed by (an air gap) a film having a patterned surface and located in between said at least portion of the surface of the waveguide substrate and the optical element.

4. The optical system according to claim 3, wherein said air gap film is by its substantially unpatterned surface either attached to said at least portion of the waveguide substrate such that said patterned surface faces the optical element, or attached to said surface of the optical element such that said patterned surface faces said at least portion of the waveguide substrate.

5. The optical system according to claim 1, wherein the protrusions include dielectric material.

6. The optical system according to claim 5, wherein said cross section of the protrusions gradually reduces from the base portion towards the distal end, such that amount of said dielectric material of the protrusion at the base portion is maximal.

7. The optical system according to claim 6, having one of the following configurations: (i) amount of the dielectric material of the protrusion at the distal end is minimal; and (ii) a proportional portion of the dielectric material of the protrusion reduces from substantially equal to one at the base portion towards substantially equal to zero at the distal end.

8. The optical system according to claim 1, wherein a length of the protrusion is less than 1 micron.

9. The optical system according to claim 1, wherein an effective refractive index at the protrusion distal end is substantially equal to a refractive index of air.

10. The optical system according to claim 1, wherein the patterned interface comprises a periodic pattern.

11. The optical system according to claim 1, wherein the patterned interface has a configuration of a moth eye.

12. The optical system according to claim 1, wherein the optical element has at least one of the following configurations: is configured as a flat transparent substrate; is configured as a collimating module; is configured as a lens; comprises at least one lens having a substantially flat surface by which it faces the patterned interface.

13. The optical system according to claim 1, further comprising an additional optical element optically coupled to another portion of a surface of the waveguide substrate via an additional patterned interface.

14. The optical system according to claim 13, wherein the patterned interfaces are associated with opposite surfaces of the waveguide substrate, respectively.

15. The optical system according to claim 14, wherein the optical elements are lenses serving for, respectively, imaging the light waves indicative of the image being projected onto user's eye and imaging an external scene onto the user's eye.

16. The optical system according to claim 1, wherein the waveguide substrate comprises at least one partially reflecting surface for coupling the light waves out of the substrate.

17. The optical system according to claim 16, wherein said at least one partially reflecting surface has at least one of the following configurations: is inclined with respect to the major surfaces of said waveguide substrate; is configured as a diffractive element; is a substantially flat surface; (iii) is a curved surface.

18. An augmented reality system comprising: the optical system of claim 1; an image generator device for generating light indicative of the augmented image; and a collimating module for receiving said light and directing the collimated light waves indicative thereof towards the waveguide substrate.

19. A head up display system comprising: the optical system of claim 1; an image generator device for generating light indicative of the image to be projected; and a collimating module for receiving said light and directing the collimated light waves indicative thereof towards the waveguide substrate.

20. An electronic device comprising the optical system according to claim 1, having one of the following configurations: being configured as a smartphone device; being configured as a smartwatch device; comprising the optical element configured as a touchscreen.

* * * * *